Feb. 16, 1960   W. C. SHAW   2,925,255
AIRCRAFT AIR CONDITIONING SYSTEM
Filed Nov. 30, 1955   3 Sheets-Sheet 1

INVENTOR.
WALTER C. SHAW
BY
Teller & McCormick
ATTORNEYS

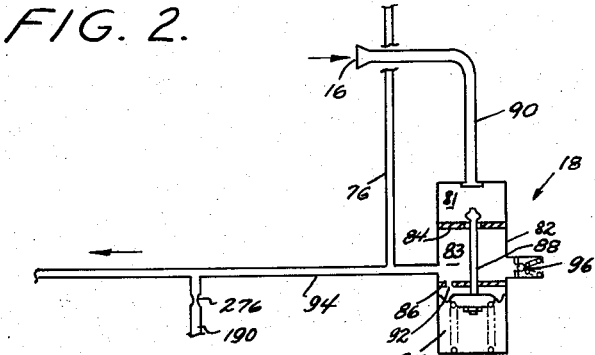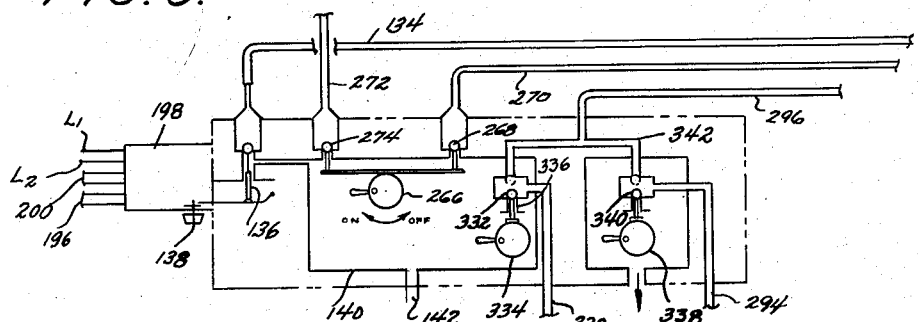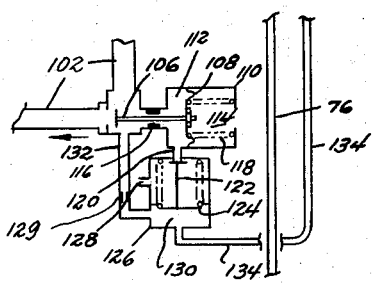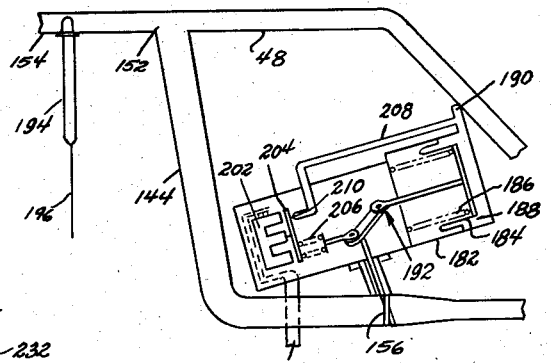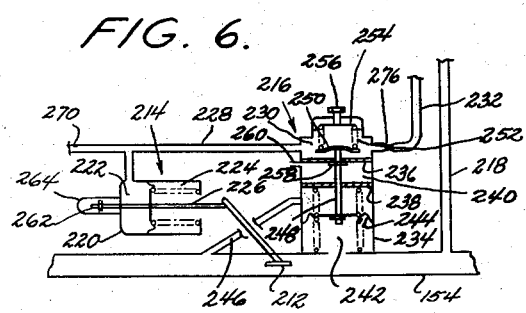
INVENTOR.
WALTER C. SHAW

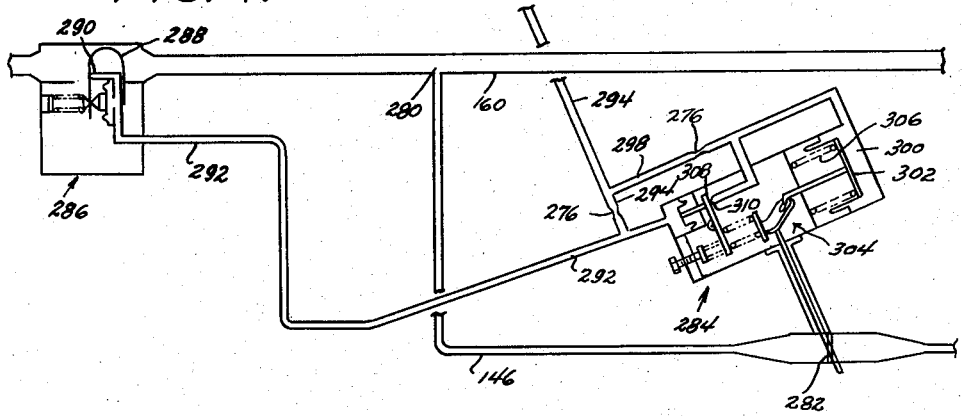
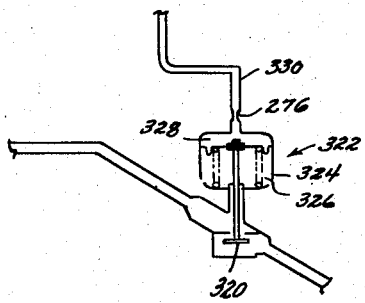

United States Patent Office 2,925,255
Patented Feb. 16, 1960

2,925,255

AIRCRAFT AIR CONDITIONING SYSTEM

Walter C. Shaw, East Hartford, Conn., assignor to United Aircraft Corporation, East Hartford, Conn., a corporation of Delaware Application November 30, 1955, Serial No. 549,999

7 Claims. (Cl. 257—276)

This invention relates to an improved air conditioning system and, more particularly, to an air conditioning system for an aircraft.

It is the general object of the invention to provide one central system to supply all or substantially all of the requirements aboard an aircraft for conditioned air, whether the requirements relate to pressure conditioned air, to temperature conditioned air, or to both pressure and temperature conditioned air.

A further object of the invention is to provide an overall air conditioning system which is dependable and automatic in operation, requiring as the only manual operation the preliminary setting of control devices such as "On-Off" switches, temperature and pressure selectors and like control elements which require only infrequent attention or adjustment.

There are other, more specific objects as well as advantages of the invention which will become apparent to those skilled in the art from the following description taken in connection with the attached drawings. The drawings show but one embodiment of the invention and, as will be seen by the claims forming a part of this specification, the invention embraces other embodiments and equivalents of that shown in the drawings wherein, Fig. 1 is a schematic view of an air conditioning system as may be provided in accordance with the invention;

Fig. 2 is an enlarged view, taken from Fig. 1, of the means providing a source of air at controlled pressure to operate valves, valve actuators and other control devices within the system;

Fig. 3 is an enlarged view, taken from Fig. 1, of the manual control elements;

Fig. 4 is an enlarged view, taken from Fig. 1, of the means for opening and closing the compressed air supply conduit for the system;

Fig. 5 is an enlarged view, taken from Fig. 1, of the means for controlling temperature in the main air conduit to the aircraft cabin;

Fig. 6 is an enlarged view, taken from Fig. 1, of the means for maintaining and controlling a pressure drop in the main air conduit to the aircraft cabin;

Fig. 7 is an enlarged view, taken from Fig. 1, of the means for controlling temperature in the inside air conduit to the cabin windshield;

Fig. 8 is an enlarged view, taken from Fig. 1, of the valve mechanism for controlling flow in the outside air conduit to the cabin windshield; and Fig. 9 is an enlarged view, taken from Fig. 1, of the ram air inlets and control elements associated therewith.

Figure 1:
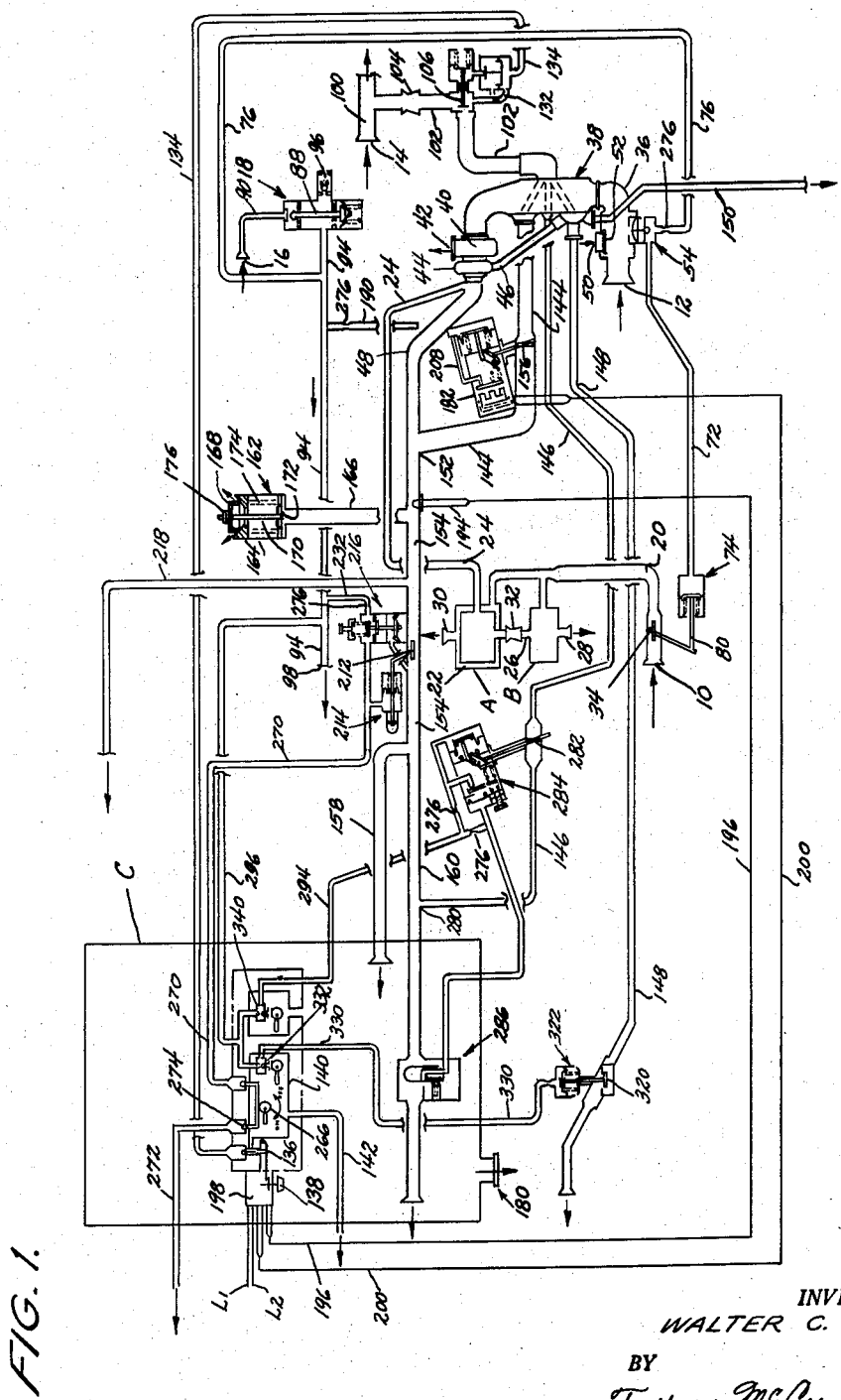

As the description of the invention progresses, it will become apparent that an air conditioning system can be provided in accordance with this invention to supply many different compartments, devices, and components of an aircraft with conditioned air whether such compartments, devices, etc. all have need for air at the same pressure and temperature or whether the requirements necessitate supplying the various compartments, devices, etc. with air at various pressures and/or temperatures.

The system shown in Fig. 1 is particularly adapted to supply an aircraft where the requirements for conditioned air are many and are different or varied. In order that the advantages of the system may be fully appreciated, let it be assumed that the aircraft includes a pilot's cabin C which must be supplied with air under pressure and at a temperature selected by the pilot; that a compartment A must be supplied with air under pressure which is not critical, but which differs from a cabin pressure which the pilot would select for comfort and at a temperature which would not ordinarily be selected by the pilot; that a compartment B has a temperature requirement, but no pressure requirement; that a pilot's space suit (not shown) requires air at a pressure a controlled or selected amount greater than cabin pressure at any given time; that a pilot's "G suit" and one or more flight instruments require air at a substantially constant pressure; that a cabin windshield de-fogging device (not shown) requires air on the inside of the windshield at a higher temperature than would be selected for pilot comfort; that a rain removal device requires air at another temperature; and let it be further assumed that air must flow from the system under pressure to the fuel tanks of the aircraft to assure proper fuel control.

The air conditioning system of Fig. 1 which satisfies all of the aforesaid requirements utilizes ram air and compressed air which may be taken from the aircraft's engine compressor. The system also requires a source of air at a substantially constant pressure to operate valve actuators and other control devices within the system, the said source also receiving its air supply from the engine compressor. There are two ram air inlets indicated at 10 and 12, and there are two compressed air inlets indicated at 14 and 16, the inlet 14 introducing compressed air to the system per se and the inlet 16 introducing compressed air to constant pressure source or pressure regulating means 18 which supplies the air-operated control devices in the system.

The ram air inlet 10 is in a conduit 20 which extends to the compartments A and B to supply the said compartments with a cooling stream of air. It will be observed that the ram cooling air is introduced to a jacket 22 surrounding the compartment A which must be pressurized. Thus, the ram cooling air, which is not pressure controlled, will not be permitted to mix with pressurized air introduced to the compartment A within the jacket 22 through a conduit 24. As will be more fully appreciated hereinafter, the air in conduit 24 not only pressurizes the compartment A but also helps to cool that compartment and the compartment B. That is, the pressurized air in the interior of the compartment A will cool that compartment and can flow through a conduit 26 into the compartment B where it intermixes with ram air before discharge at an outlet 28. The ram air in the jacket 22 is discharged through an outlet 30. While the compartment B is open to atmosphere at the outlet 28, pressure is maintained within the compartment A by placing a flow limiter or restrictor 32 in the transfer conduit 26.

The pressurized air in conduit 24 is the only cooling air provided for the compartments A and B under certain conditions and under all other conditions it is supplemented as the cooling medium by ram air from the conduit 20. That is, there are times when the ram air is too hot properly to cool the compartments and the ram air should be shut off. A shut-off valve 34 is provided in the conduit 20 and is adapted to close said conduit when the ram air temperature reaches or exceeds a preselected or known point, as for example 140° F. The valve 34 is adapted to open the ram air conduit 20 when the ram air temperature drops to or below a preselected or known point, as for example 110° F. The temperature responsive operating means for the valve 34 will be described hereinafter.

The ram air inlet 12 is in a conduit 36 extending to a heat exchanger 38 which effects heat exchange between ram air and compressed air introduced to the system at the inlet 14. The ram air flowing through the heat exchanger 38 provides the cooling medium therein and the ram air flow is assisted by a turbine driven suction fan 40 which discharges the ram air from the aircraft at the outlet 42. The turbine driving the fan 40 is indicated at 44, the said turbine being driven by compressed air flowing in a conduit 46 extending from the heat exchanger 38 to the said turbine. The compressed air in conduit 46 which has been cooled in the heat exchanger 38 is further cooled by expansion in the turbine 44 before it is discharged to a main cold air conduit 48. The pressurized cold air conduit 24 for the compartment A extends from the main cold air conduit 48.

It should be understood that while the temperature of ram air introduced to the system at the inlet 12 may be quite high under certain flight conditions, the ram air temperature under any anticipated condition will not exceed the compressed air temperature. Therefore, the ram air can always be used as a cooling medium in the heat exchanger 38 and it is not necessary to provide a temperature responsive shut-off valve in the ram air conduit 36. However, there are certain conditions of operation, known to occur only during ground run-up, when restrictions or externally induced suctions on the ram inlet are such as to so reduce the flow and density of the ram air as to permit overspeeding of the turbine 44 and fan 40. To avoid this undesirable result, an ambient air inlet 50 is provided in the ram air conduit 36 (see Fig. 9). The said ambient air inlet is normally closed by a flap valve 52 but will open when there is inadequate ram air flow or pressure and the turbine driven fan 40 can draw air through the inlet 50 to avoid turbine overspeeding.

While the ram air conduit 36 contains no temperature responsive shut-off valve, it has been found convenient to locate a temperature sensitive unit 54 therein, the said unit being operatively associated with the shut-off valve 34 in the ram air conduit 20. As best seen in Fig. 9, the unit 54 comprises a bowed or curved metal plate 56 which is secured at its periphery within a chamber 57 defined within a casing 58 disposed in the conduit 36 so that the chamber 57 receives ram air therein. The bowed plate 56 will be curved in one direction shown (for example, concave outwardly with respect to conduit 36) when the ram air does not reach or exceed a certain point, as for example 140° F. When ram air temperature reaches or exceeds approximately 140° F., the plate will snap through center and be curved in the opposite direction (concave inwardly with respect to conduit 36). The plate will remain in the last mentioned position until the ram air temperature drops to or below a certain point, as for example 110° F., then the plate will resume the first mentioned position.

The plate 56 carries with it a valve 60 which closes an opening 62 into a vent chamber 64 when the plate is in the position shown. When the plate assumes the other, or high temperature position, the valve 60 opens the vent chamber to permit the discharge of air through an outlet 66 and the said valve closes the inlet 68 to a flow chamber 70. The flow chamber 70 also has an outlet which is connected by means of a conduit 72 to an actuator 74 for the valve 34. The inlet of the chamber 70 is connected by a conduit 76 with the regulated pressure source means 18, the regulated pressure air received therefrom being used in operation of the valve actuator 74. The said valve actuator comprises a cylinder 78 containing a spring biased piston 80 which is opposed within the cylinder by air from the pressure regulator 18. When the temperature responsive plate 56 and valve 60 are in the position shown, air flows from the regulator 18 to the actuator 74 to retain the valve 34 in the open position shown. When the plate 56 is shifted to the other described position as a result of an increased ram air temperature, the conduit 72 is vented so that the actuator piston may be moved by spring force to close the valve 34. Therefore, the temperature responsive unit 54 is the means employed to cause opening and closing of the valve 34 in the ram air conduit 20.

It will be readily understood that means for regulating the pressure of compressor air to the needs of the valve actuator 74 and other control elements can be supplied in a variety of forms. The regulator 18 shown in Fig. 2 comprises a housing 82 having two partitions 84 and 86 defining, in top-to-bottom order, an inlet chamber 81, a flow chamber 83, and a piston chamber 85. A piston-like valve 88 is disposed within the housing to extend through the said partition, the valve being biased within the piston chamber to open a flow aperture in the partition 84 between the inlet and flow chambers. The inlet chamber 81 is connected with a conduit 90 having the compressed air inlet 16 whereby compressed air may flow through the inlet chamber into the flow chamber 83 within the housing 82. A controlled pressure drop from the inlet chamber to the flow chamber is effected by providing the upper end of the valve 88 with a taper which will variably restrict the flow aperture between the inlet chamber and the flow chamber. The position of the valve 88, and thus the amount of opening between the inlet chamber and flow chamber, is controlled by the air pressure in the flow chamber 83 and piston chamber 85. That is, an aperture 92 is provided in the partition 86 so that air will flow into the piston chamber 85 and oppose the biasing force on the piston in such a direction as to close the aperture between the inlet chamber and the flow chamber. Thus, if pressure in the flow chamber and piston chamber increases, the opening between the inlet and flow chambers will become more restricted to increase the pressure drop thereby decreasing the pressure in the flow chamber and piston chamber. Flow through the flow chamber 83 is discharged into a main regulated pressure conduit 94, but in the event that pressure in the flow chamber and in the conduit 94 exceeds a predetermined level, the excess pressure will be relieved through an opening in the flow chamber normally closed by a relief valve or check valve 96.

As a result, the means 18 provides a source of air at a regulated pressure which is carried in a conduit 94. The conduit 76 supplying air to the ram air valve actuator 74 communicates with the main regulated pressure conduit 94 as do all of the other conduits which will be described and which carry servo air for the various control valves, valve actuators, and control elements. The main regulated pressure conduit 94 may conveniently be extended to the pilot's G-suit and to the flight instrument or instruments or to other devices requiring a supply of air at a substantially constant or regulated pressure. Such extension of the conduit 94 is indicated at 98.

The compressed air inlet 14 is disposed in a conduit 100 extending to the alternator (not shown) for the aircraft's power supply. A conduit 102 which communicates with the conduit 100 delivers compressed air to the air conditioning system. A flow limiting device 104, preferably of the Venturi type, is disposed in the conduit 102 to assure sufficient flow to the alternator, if the ducting leading to or within certain portions of the air conditioning system should become disconnected.

The flow of air in the conduit 102 can be shut off by a poppet valve 106 which is operated by pneumatic actuating means best shown in Fig. 4. The said actuating means is not automatically controlled but is manually controlled at a remote position by pilot operated means shown in Fig. 3. The poppet valve 106 is moved by a diaphragm-piston 108 disposed within a housing 110 having an air chamber 112 and a spring chamber 114. The air chamber 112 receives compressed air from the conduit 102 through a restricted passageway 116 surrounding the poppet valve 106 and the pressure of the air within said chamber against the diaphragm-piston 108 normally opens the poppet valve 106 which is biased towards closed position by a spring 118 disposed within the spring chamber 114. It will be observed that the poppet valve 106 can be closed to shut off the supply of compressed air to the air conditioning system by venting the air chamber 112.

The air chamber 112 has a vent or outlet 120 which is normally closed by a pilot valve 122 connected with a diaphragm-piston 124 within a housing 126. It will be observed that the pilot valve 122 is spring biased towards open position and that when the pilot valve 122 is opened, the air from the air chamber 112 can be discharged through the outlet 120 and an outlet 128 in the housing 126. However, the pilot valve 122 is normally closed by air pressure within a chamber 130 which communicates through a conduit 132 with the compressed air conduit 102. Compressed air is discharged from the chamber 130 through a conduit 134 when said conduit is opened by a manually operable valve 136 located remotely for operation by the pilot. This discharge of air causes a flow and thereby a pressure drop through a restrictor 129 in conduit 132, thereby resulting in a reduced pressure in the chamber 130.

The manually operable valve 136 is a vent valve which is opened to cause closing of the compressed air conduit 102 at any time desired. As shown in the drawings, the valve 136 is opened by thrusting it inwardly and this can be accomplished by thrusting inwardly a control knob 138. When the valve 136 is opened, compressed air is released from the conduit 134 into a compartment 140 which is vented to atmosphere as shown at 142. The conduit 134 and pilot valve chamber 130 being vented, the pilot valve 122 will be displaced to vent the poppet valve air chamber 112 whereby the spring biased poppet valve 106 in the compressed air conduit 102 will close to shut off the compressed air supply to the system thereby making the system inoperable.

When the shut-off valve 106 is open as shown, hot compressed air in the conduit 102 will flow therethrough to the heat exchanger 38 wherein it is cooled. The heat exchanger 38 is preferably a multiple stage exchanger having compressed air outlets containing air at different temperatures. More specifically, one such compressed air outlet conduit is indicated at 144 wherein the temperature is relatively high but nonetheless lower than the temperature of the compressed air in the conduit 102. This conduit 144 will hereinafter be referred to as a "hot" compressed air conduit within the system. Another compressed air outlet conduit 146 may also carry air at a relatively high temperature while additional conduits 148, 150, and 46 will carry compressed air at a relatively low temperature, these conduits being arranged to receive compressed air after it has passed through the last stage of heat exchange. The conduit 46, as previously mentioned, extends to the turbine 44 to supply the driving air therefor. The air from the conduit 46 gives up more heat in expansion within the turbine 44 and is relatively cold when it flows into the conduit 48. The conduit 150 may be extended to the fuel tanks (not shown) or to other devices on the aircraft to supply the same with necessary air pressure. The conduit 148, in the example shown, extends outside of the cabin C to the rain removal device (not shown) as will be more fully described hereinafter.

It will be observed that the main cold air conduit 48 and the main hot air conduit 144 are interconnected at 152 and that a conduit 154 extends from said point of interconnection. The conduit 154 will hereinafter be referred to as the "mixed air" conduit because it may contain a pressurized mixture of cold air and hot air. The conduit 154 will at all times receive cold air from the conduit 48 but it will receive hot air from the conduit 144 only when a valve 156 is opened therein. As will be described hereinafter, the valve 156 is automatically operated to close or to be opened to varying degrees to admit a desired amount of hot air to the mixed air conduit 154. The mixed air conduit may be employed to supply various compartments and devices aboard the aircraft with pressure and temperature controlled air. In the example shown, the mixed air conduit 154 supplies air to the cabin C through a conduit 158 and also supplies air to a de-fogging device on the inside of the cabin windshield through a conduit 160.

Pressure within the mixed air line 154 and pressure within the hot air line 144 and the cold air lines 48 and 24 is limited to a selected maximum by means indicated generally at 162. The said pressure limiting means comprises a housing 164 which is connected with the mixed air line 154 through a conduit 166. The housing 164 has an open top which is normally closed by a valve dome 168. A threaded stem 170 extends through said dome and is connected at its bottom end with a spider 172 providing a seat for a vertically extending spring 174. The spring 174 which is engaged within the housing 164 biases the spider 172 and thus the valve dome 168 downwardly to close the said dome on the housing. When air pressure within the mixed air conduit 154 and the other conduits mentioned above exceeds a preselected maximum, it will lift the dome 168 from its seat to discharge air and thus relieve pressure within the said conduits. The pressure level at which the escape valve or dome 168 will open (the upper limit of pressure within the mixed air conduit and the other conduits) may be selected by adjusting an externally disposed nut 176 on the stem 170 so as to adjust the compression of the spring 174 which holds the valve or dome 168 closed.

Precise control of the pressure in the mixed air line 154 at levels below the selected maximum is not essential to successful operation of the air conditioning system. However, at least some pressure control or regulation within the conduit 154 is effected by controlling the pressure within the cabin C. That is, the cabin may be provided with manually or automatically operable valve means such as indicated generally at 180 so that cabin pressure can be adjusted to a comfortable level. Adjustment of the pressure within the cabin C will be reflected in the pressure existing in the conduit 154. It is important to provide means for maintaining a pressure drop within the conduit 154 on the downstream side of the pressure relief means 162. The means providing the pressure drop and the purpose thereof will be described hereinafter.

It is, of course, desirable to provide means whereby a pilot or occupant of the cabin C can select the temperature of the compressed air introduced and it is desirable to have means capable of automatically controlling the temperature after selection has been made. As previously mentioned, the valve 156 disposed in the hot air conduit 144 controls the flow of hot air to the mixed air conduit whereby the mixed air temperature can effectively be controlled. There are various actuating devices which are temperature responsive and which might be employed to operate the valve 156. For example, valve operating means of the type disclosed in the James S. Sims, Jr. et al. application, Serial No. 471,152, filed November 26, 1954, could be employed in this system.

The valve actuator employed here and as shown in Fig. 5 is somewhat similar to the means shown in the aforesaid application. The said means includes a housing 182 wherein a diaphragm-piston 184 is disposed, the said piston being biased in one direction by a spring 186 and biased in the other direction by compressed air within a chamber 188. The chamber 188 receives compressed air from a conduit 190 which communicates with the main regulated air conduit 94 extending from the pressure regulating valve means 18. It will be observed that the diaphragm-piston is connected by a linkage indicated generally at 192 with the valve 156 to adjust its position within the hot air conduit 144. Fluid pressure acting upon the diaphragm-piston through the linkage 192 causes the valve 156 to be opened while the spring 186 acts upon the diaphragm-piston to close the valve 156 within the hot air conduit. Adjustment of the position of the valve 156 to adjust the temperature in the conduit 154 is effected by varying the air pressure in the chamber 188.

The means for varying the said air pressure is temperature responsive. The said temperature-responsive means includes a temperature sensing element 194 which is disposed in the mixed air conduit 154 and which is electrically connected by an electrical conduit 196 to an electrical control unit 198 within the cabin C. The said unit 198 is connected to the ship's electrical power supply by the lines L1 and L2 and has a line or electrical conduit 200 extending to the valve actuator housing 182 and connected with a proportional solenoid 202 therein. The electrical circuit connections for varying the energy to the solenoid 202 in response to temperature changes sensed by the element 194 form no part of the present invention. However, such a circuit may comprise a bridge network which includes the element 194 as a resistor subject to variation with temperature changes. The said network may also include a variable resistor controlled by the knob 133 which the pilot manipulates in selecting a desired cabin temperature. Variation in the resistor 194 as a result of temperature change in the conduit 154 may unbalance the bridge network so as to vary the electrical energy supplied to the solenoid 202. The circuit can be so arranged that a decrease in temperature within the conduit 154 will decrease the energy to the solenoid 202. As shown in Fig. 5, the solenoid is arranged to move a pivoted armature 204 in a counterclockwise direction as a result of increased electrical energy. The armature 204 is biased in a clockwise direction by a spring 206, so that when the solenoid energy is reduced, the spring 206 will rotate or pivot the armature.

Rotation of the armature 204 is utilized to vary the air pressure in the chamber 188 by extending a conduit 208 from the said chamber toward the armature 204, the extending end of the conduit 208 being provided with a nozzle 210 which can be closed by the armature when it is pivoted as far as possible in the clockwise direction. When the nozzle is completely closed, the pressure in the chamber 188 will be sufficient to move the diaphragm-piston to completely open the valve 156. When the armature 204 is removed a slight distance from the nozzle 210, pressure within the chamber 188 will be reduced at least a slight amount so that the valve 156 will start to close. As previously mentioned, the armature is pivoted in the counterclockwise or nozzle-opening direction by the solenoid as a result of a temperature increase in the conduit 154. If the said temperature increase is substantial, the energy to the solenoid 202 will be relatively high and the armature will be pivoted a greater distance in the nozzle-opening direction. As a result, the pressure in the chamber 188 will be greatly reduced thereby causing the valve 156 to be closed. Fluctuation of the valve 156 is dampened by a feedback. That is, the armature-moving spring 206 is compressed by the valve operating linkage 192 when the valve is moved toward a closed position, thereby exerting greater spring force on the armature to move it toward a nozzle-closing position. It will be readily understood that a decrease in temperature within the conduit 154 sufficient to cause a large unbalance of the electrical bridge will sufficiently de-energize the solenoid 202 to permit the armature 204 to close the nozzle 210 thereby increasing the fluid pressure in the chamber 188 so as to fully open the valve 156.

As previously mentioned, it is desirable to maintain and control a pressure drop in the conduit 154 on the downstream side of the pressure limiting means 162. The means for maintaining and controlling the pressure drop in the conduit 154 is best shown in Fig. 6 and comprises a throttle valve 212 in the line 154, a throttle valve actuator 214 and control means 216 for the actuator 214. It will be observed that the throttle valve 212 is disposed downstream of a conduit 218 extending from the mixed air conduit 154. The conduit 218 supplies compressed air to a pilot's space suit which should receive a supply of air at a pressure greater than the cabin air pressure in the conduit 158 and in the conduit 154 on the downstream side of the valve 212. It is the purpose of the valve 212 to assure that pressure will be maintained in the conduit 218 at greater than cabin pressure and the valve 212 also assures maintaining pressure in the cold air conduit 24 at a level greater than cabin pressure. Thus, the throttle valve 212 provides the means for maintaining pressure in compartments and devices within the aircraft in excess of the pressure in the cabin. In addition, the throttle valve 212 can be closed to maintain pressure in such compartments and devices when no cabin pressure is needed.

The valve actuator 214 includes a housing 220 having a diaphragm-piston which defines an air chamber 222 and a spring chamber 224 within the housing. The diaphragm-piston is connected to the valve 212 by a mechanical linkage including a link 226 extending through the housing 220. Air pressure acting upon the diaphragm-piston tends to open the valve 212 in the conduit 154 and spring forces acting upon the diaphragm-piston tend to close the valve 212. Adjusting the valve 212 in various open positions in the conduit 154 to control the pressure drop therein is achieved by varying or adjusting the pressure in the air chamber 22. The air chamber 222 is connected by a conduit 228 with a flow chamber 230 in the actuator control means 216. The flow chamber 230 is connected by a conduit 232 with the main regulated pressure conduit 94 extending from the pressure regulating valve 18. The actuator control means 216 is a device for comparing air pressure on the downstream side of the valve 212 with air pressure on the upstream side of the valve 212 and for adjusting pressure in the flow chamber 230 in accordance therewith so as to adjust air pressure in the actuator 214. More specifically, the control means 216 comprises a housing 234 having two partitions 236 and 238 defining three chambers within the said housing. The said chambers comprise in top-to-bottom order the flow chamber 230, a vent chamber 240, and a working chamber 242. A diaphragm-piston 244 is disposed within the working chamber 242 and is exposed on one side to air within the conduit 154 upstream of the valve 212. On the other side of the diaphragm-piston, air is introduced from the downstream side of the valve 212 through a passageway 246. A stem 248 extends from the diaphragm-piston through the partitions 236 and 238 into the flow chamber 230. A spring seat 250 is secured to the stem 248 within the flow chamber 230 and a spring 252 is seated thereon and on an adjustable seat 254. The seat 254 is adjusted by a screw 256 to vary the force biasing the piston stem 248 and thus the diaphram-piston from the downstream side of the valve 212. The spring biasing force is supplemented by air pressure within the working chamber 242 from the downstream side of the valve 212. Accordingly, adjustment of the spring seat by the screw 256 will adjust the biasing force on the diaphragm-piston so that the said piston will move downwardly when the difference in pressure across the valve 212 from the upstream to the downstream sides thereof is less than a selected amount which has been selected by adjustment of the screw 256. Downward movement of the diaphragm-piston 244 and the piston stem 248 as a result of a pressure drop across the valve 212 which is less than the selected minimum is used to cause partial closing of the valve 212 to increase the pressure drop in the following way. A valve disk 258 is secured to the piston stem 248 to close an aperture in the partition 236 between the flow chamber 230 and the vent chamber 240 when the pressure drop across the valve 212 equals or exceeds the preselected minimum. When the said pressure drop is less than the preselected minimum and the piston stem 248 moves downwardly, the valve disk 258 is unseated in the aforesaid aperture so that air may flow from the flow chamber 230 to the vent chamber 240 and be discharged therefrom through one or more vent openings 260. Discharge or venting of the air from the flow chamber 230 will, of course, reduce the air pressure in the actuator air chamber 222 which, as previously described, causes the valve 212 to be moved toward closed position in the conduit 154 to increase the pressure drop thereacross.

Accordingly, the valve 212, the valve actuator 214 and the control device 216 provide means for maintaining a pressure drop which will always be at least as great as a preselected minimum. As a result, flow through the conduit 218 to the pilot space suit and flow through the cold air conduit 24 to the pressurized compartment A is always assured. The pressure drop across the valve 212 can be controlled so as not to exceed a preselected maximum if desired. That is, means can be employed to limit the movement of the throttle valve 212 in the closed direction. Such means can conveniently be associated with the link 226 which extends through the actuator 214. For example, an extension 262 of adjustable effective length can be secured to the free end of the link 226 to engage with a stop 264 after the link 226 has moved a selected distance corresponding to closing movement of the valve 212 to a preselected maximum closed position.

The aforesaid maximum closed position of the valve 212 may be a completely closed position within the conduit 154 and, in any event, the said maximum closed position may be employed when it is desired to shut down the flow of air to the cabin C or to reduce the pressure of air flow thereto to a relatively low level. This selective positioning of the throttle valve 212 in the maximum closed position is effected by manual manipulation of an on-off selector 266 shown in Fig. 3. The selector 266 when shifted to the "off" position opens a valve 268 in a conduit 270 which communicates with the air chamber 222 in the valve actuator 214. The valve 268 then vents the conduit 270 and the air chamber 222 to close the throttle valve 212. The air vented from the conduit 270 flows into the previously mentioned compartment 140 and through the vent conduit 142 for discharge from the aircraft. An additional vent for the compartment 140 is preferably provided and comprises a vent conduit 272 which is opened and closed by a valve 274 operating with the valve 268.

The manually operable valves 268 and 274 are opened by the switch element 266 only when it is desired to shut off a pressured supply of air to the cabin C. This does not shut down all operation of the air conditioning system, but only shuts down the supply of pressured air to the cabin. The system will continue to supply the other devices and compartments aboard the aircraft from the mixed air conduit 154 with pressured air from the upstream side of the throttle valve 212. By limiting the maximum closed position of the throttle valve 212 to less than a fully closed position, the cabin can continue to receive warm air through the cabin inlet 158 but at no substantial pressure. In addition, the de-fogging conduit 160 to the inside of the cabin windshield will continue to receive warm air but at no substantial pressure. The air conditioning is completely shut off only when the valve 136 is opened by the temperature control knob 138 as previously described.

Furthermore, opening the valve 268 to vent the air chamber 222 in the valve actuator 214 does not vent all of the air at controlled pressure from the main regulated pressure conduit 94. More specifically, a restrictor 276 is provided in the regulated pressure conduit 232 to maintain pressure within the main regulated pressure conduit 94 during the aforesaid venting. Similar restrictors, which are similarly identified by the reference 276, are employed in the various regulated pressure conduits extending from the main regulated pressure conduit 94 to the various valve actuators and control devices which have been described and which will be described hereinafter. All of the restrictors 276 serve the same purpose, namely, to maintain pressure within the main regulated pressure conduit 94 when the various control valves, etc. are vented and even when the air conditioning system is completely shut down.

Under most operating conditions it will be desirable to have the air within the de-fogging or de-frosting conduit 160 at a temperature greater than that maintained within the cabin inlet conduit 158 and in the mixed air conduit 154. To provide an increased temperature in the conduit 160 which communicates with the mixed air conduit 154, the warm air conduit 146 extending from the heat exchanger 38 is connected to the conduit 160 at the point 280. Under some operating conditions, the air in the conduit 146 when mixed with the air in the conduit 160 may cause the temperature thereof to rise more than desired. Therefore, a throttle valve 282 is disposed in the warm air conduit 146 to govern the flow therethrough and into the conduit 160. A valve actuator indicated generally at 284 and best shown in Fig. 7 positions the valve 282 within the warm air conduit 146. The valve actuator 284 is responsive to temperatures of the mixed air within the conduit 160 whereby the temperature is self-governed in the said conduit. It will be readily understood that various types of temperature responsive mechanisms might be employed for the aforesaid purpose, one such type being that disclosed for regulating the temperature in the conduit 154. The means employed here for controlling the position of the valve 282 and thus for controlling temperature in the de-fogging conduit 160 are the same means shown in the application of Farkas et al. entitled "Temperature Responsive Control Valve," and filed of even date herewith.

As more specifically described in the aforementioned application of Farkas et al., the temperature responsive valve control means includes a temperature sensor indicated generally at 286. The said temperature sensor comprises a bimetallic strip 288 exposed to mixed air within the conduit 160 and which is responsive to temperature changes therein to open and close a nozzle 290 on the end of a conduit 292 extending to the valve actuator 284. The conduit 292 also is in communication with the main regulated pressure conduit 94 through interconnecting conduits 294 and 296. The conduit 294 is also connected through a conduit 298 to the actuator 284 supplying an air chamber 300 therein. Air under pressure within the chamber 300 forces a diaphragm-piston 302 in one direction whereby to shift the valve 282 through an interconnecting linkage indicated generally at 304. The diaphragm-piston is biased in the other direction to move the valve 292 in the other direction by a spring 306. The bimetallic strip 288 may be affected by a change in temperature which, for example, may be considered as an increase in temperature, to open the nozzle 290 thereby bleeding the line 292 to decrease pressure on an armature 308 within the actuator 284 so as to bleed another nozzle 310 communicating with the air chamber 300. As a result, pressure within the air chamber 300 will be reduced to permit the spring to shift the valve 282 in what must be a closed direction to reduce the amount of warm air flowing through the conduit 146 into the de-fogging conduit 160. Reduction in the warm air flow will, of course, reduce the mixed air temperature in the said de-fogging conduit. It will be readily understood that a decrease in the mixed air temperature in the de-fogging conduit 160 will cause the bimetallic strip 288 to close the nozzle 290 which will effect closing of the nozzle 310 in the actuator 284 to increase the pressure in the air chamber 300 and to effect an opening of the valve 282. When the valve 282 is moved in the open direction, more warm air is introduced to the de-fogging conduit 160 so as to increase the temperature therein.

As previously mentioned, the conduit 148 extending from the heat exchanger 38 provides an air source for the outside of the windshield for a rain removing device or the like. Such air on the outside of the cabin windshield is primarily used to accelerate evaporation and removal of rain and moisture from the outside surface of the windshield. It will be readily understood that relatively warm air can be used for this purpose and that critical temperature control is not necessary. The only control within the conduit 148 is effected to open or selectively to close said conduit. The means opening and closing the conduit comprises a valve 320 which is operated by air air pressure actuator 322. More specifically (see Fig. 8), the actuator 322 includes a housing 324 having a diaphragm-piston therein defining a spring chamber 326 and an air chamber 328 on opposite sides of the said piston. Air is supplied to the chamber 328 through a conduit 330 which is connected in a valve 332 with the regulated pressure conduit 296 (Fig. 3). Air under pressure in the conduit 330 and the chamber 328 forces the diaphragm-piston in one direction to open the valve 320. The valve 320 may be closed by spring force when the valve 332 (Fig. 3) is manually positioned by control means 334 to close the regulated pressure conduit 296 and open the conduit 330 to a vent 336. Accordingly, the valve 332 is operated by the pilot to open or close the rain removal conduit 148. Obviously, it will be desirable to close the conduit 148 at all times except when moisture collects on the outside of the cabin windshield.

It will also be desirable to close the inside windshield conduit 160 to the flow of hot air except for the time that it is necessary to remove condensate from the inside of the windshield. This is effected by a manually operable control element 338 which is similar to the element 334 and which controls a valve 340 disposed between the regulated pressure conduit 294 and the regulated pressure conduit 296. That is, when the pilot does not want to have warm air blowing on the inside of the cabin windshield, he manipulates the control 338 so that the valve 340 will close a conduit 342 extending from the valve to the regulated pressure conduit 296 and at the same time venting the conduit 294 through the valve 340. This will, of course, reduce the air pressure in the valve actuator 284 so as to close the throttle valve 282 in the warm air conduit 146.

While the air conditioning system shown has been described with reference to a particular installation which includes specific devices such as the inside and outside windshield de-fogging elements, the pressurized compartment A, and the pilot's space suit, it will be readily understood that the system can be used to supply additional and/or other devices which are aircraft components or carried by the aircraft. Therefore, it should be understood that the invention is not limited to an air conditioning system supplying the particular elements and devices mentioned. Obviously, the system can be adapted to serve many and diverse purposes as reflected in the scope of the claims which follow.

The invention claimed is:

1. An air conditioning system for an aircraft having a cabin requiring temperature and pressure conditioned air and having or carrying at least one device requiring air at greater than cabin pressure and also having or carrying at least one other device requiring air at greater than cabin temperature, the said system being adapted for connection with a source of air under pressure and comprising heat exchanging means, a main pressurized air conduit, a cold air supply conduit extending from the heat exchanging means and connected with said main conduit, two warm air supply conduits extending from said heat exchanging means and one of which is connected with said main conduit, a conduit extending from one of said connected conduits to the one device, valve means disposed in said one warm air conduit and responsive to temperature in said main conduit to control the flow of warm air thereto whereby to control temperature in said main conduit, pressure relief means in said main conduit for limiting pressure therein, a valve adjustably disposed in said main conduit downstream of said relief means and downstream of said conduit extending to the one device, valve operating means for adjusting said valve to maintain a pressure drop in said main conduit, said valve operating means including control means responsive to pressures on the upstream and downstream sides of said valve, a cabin inlet conduit extending from said main conduit downstream of said valve, conduit means extending from said main conduit to the said other device downstream of said cabin inlet conduit, the other warm air conduit and said conduit means being interconnected, and valve means disposed in said other warm air conduit and responsive to temperature in said conduit means to control flow in said other warm air conduit whereby to control temperature in said conduit means.

2. An air conditioning system for an aircraft having a cabin requiring temperature and pressure conditioned air and having or carrying at least one device requiring air at greater than cabin pressure and also having or carrying at least one other device requiring air at greater than cabin temperature, the said system comprising a main pressurized air conduit, a cold air supply conduit connected with said main conduit, two warm air supply conduits one of which is connected with said main conduit, a conduit extending from one of said connected conduits to the one device, valve means disposed in said one warm air conduit and responsive to temperature in said main conduit to control the flow of warm air thereto whereby to control temperature in said main conduit, pressure relief means in said main conduit for limiting pressure therein, a valve adjustably disposed in said main conduit downstream of said relief means and downstream of said conduit extending to the one device, valve operating means for adjusting said valve to to maintain a pressure drop in said main conduit, said valve operating means including control means responsive to pressure on the upstream and downstream sides of said valve, a cabin inlet conduit extending from said main conduit downstream of said valve, conduit means extending from said main conduit to the said other device downstream of said cabin inlet conduit, the other warm air conduit and said conduit means being interconnected, and valve means disposed in said other warm air conduit and responsive to temperature in said conduit means to control flow in said other warm air conduit whereby to control temperature in said conduit means.

3. An air conditioning system for an aircraft having a cabin requiring temperature and pressure conditioned air and having or carrying at least one device requiring air at greater than cabin pressure and also having or carrying at least one other device requiring air at greater than cabin temperature, the said system comprising a main pressurized air conduit, a cold air supply conduit connected with said main conduit, two warm air supply conduits one of which is connected with said main conduit, a conduit extending from one of said connected conduits to the one device, valve means disposed in one of said connected supply conduits and responsive to temperature in said main conduit to control flow in said one supply conduit whereby to control temperature in said main conduit, pressure relief means in said main conduit for limiting pressure therein, a valve adjustably disposed in said main conduit downstream of said relief means and said conduit extending to said one device, valve operating means adapted to adjust said valve to maintain a pressure drop in said main conduit, said valve operating means including control means responsive to pressures on the upstream and downstream sides of said valve, a cabin inlet conduit extending from said main conduit downstream of said valve, conduit means extending from said main conduit to the said other device downstream of said cabin inlet conduit, the other warm air supply conduit and said conduit means being interconnected, and valve means disposed in said other warm air conduit and responsive to temperature in said conduit means downstream of said other warm air conduit to control flow in said other warm air conduit whereby to control temperature in said conduit means.

4. An air conditioning system for an aircraft having a cabin requiring temperature and pressure conditioned air and having or carrying at least one device requiring air at greater than cabin pressure and also having or carrying at least one other device requiring air at greater than cabin temperature, the said system comprising a main pressurized air conduit, a cold air supply conduit connected with said main conduit, two warm air supply conduits one of which is connected with said main conduit, a conduit extending from one of said connected conduits to the one device, valve means disposed in one of said connected supply conduits and responsive to temperature in said main conduit to control flow in said one supply conduit whereby to control temperature in said main conduit, pressure relief means in said main conduit for limiting pressure therein, a valve adjustably disposed in said main conduit downstream of said relief means and downstream of said conduit extending to the one device, valve operating means adapted to adjust said valve to maintain a pressure drop in said main conduit, said valve operating means including control means responsive to pressures on the upstream and downstream sides of said valve, a cabin inlet conduit extending from said main conduit downstream of said valve, an inlet conduit extending from said main conduit to the said other device downstream of said cabin inlet conduit, the other warm air supply conduit and the inlet conduit for said other device being interconnected, and valve means disposed in one of the last mentioned interconnected conduits and responsive to temperature in said interconnected inlet conduit to control flow and thereby to control temperature in said interconnected inlet conduit.

5. An air conditioning system for an aircraft having a cabin requiring temperature and pressure conditioned air and having or carrying at least one device requiring air at greater than cabin pressure and also having or carrying at least one other device requiring air at greater than cabin temperature, the said system comprising a main pressurized air conduit, a cold air supply conduit connected with said main conduit, two warm air supply conduits one of which is connected with said main conduit, a conduit extending from one of said connected conduits to the one device, valve means disposed in one of said connected supply conduits and responsive to temperature in said main conduit to control flow in said one supply conduit whereby to control temperature in said main conduit, pressure relief means in said main conduit for limiting pressure therein, a valve adjustably disposed in said main conduit downstream of said relief means and downstream of the conduit extending to said one device, valve operating means adapted to adjust said valve to maintain a pressure drop in said main conduit, said valve operating means including control means responsive to pressures on the upstream and downstream sides of said valve, a cabin inlet conduit extending from said main conduit downstream of said valve, and conduit means extending from said main conduit to the said other device downstream of the cabin inlet conduit, the other warm air supply conduit and said conduit means being interconnected.

6. An air conditioning system for an aircraft having a cabin requiring temperature and pressure conditioned air and having or carrying at least one device requiring air at greater than cabin pressure and also having or carrying at least one other device requiring air at other than cabin temperature, the said system comprising a main pressurized air conduit, a plurality of cold air supply conduits one of which is connected with said main conduit, a plurality of warm air supply conduits one of which is connected with said main conduit, a conduit extending from one of said connected conduits to the one device, valve means disposed in one of said connected supply conduits and responsive to temperature in said main conduit to control flow thereto whereby to control temperature in said main conduit, a valve adjustably disposed in said main conduit downstream of the conduit extending to said one device, valve operating means adapted to adjust said valve to maintain a pressure drop in said main conduit, said valve operating means including control means responsive to pressures on the upstream and downstream sides of said valve, a cabin inlet conduit extending from said main conduit downstream of said valve, and conduit means extending from said main conduit to the said other device downstream of the cabin inlet conduit, another of said supply conduits being connected with said conduit means.

7. An air conditioning system for an aircraft having a cabin requiring temperature and pressure conditioned air and having or carrying at least one device requiring air at greater than cabin pressure, the said system comprising a main pressurized air conduit, a cold air supply conduit connected with said main conduit, a warm air supply conduit connected with said main conduit, a conduit extending from one of said connected conduits to said one device, valve means disposed in one of said supply conduits and responsive to temperature in said main conduit to control flow in said one supply conduit whereby to control temperature in said main conduit, a valve adjustably disposed in said main conduit downstream of said conduit extending to said one device, valve operating means adapted to adjust said valve to maintain a pressure drop in said main conduit, said valve operating means including control means responsive to pressures on the upstream and downstream sides of said valve, and a cabin inlet conduit extending from said main conduit downstream of said valve.

References Cited in the file of this patent

UNITED STATES PATENTS

| | | |
|---|---|---|
| 2,327,664 | Otis | Aug. 24, 1943 |
| 2,654,580 | Shaw | Oct. 6, 1953 |
| 2,655,174 | Towler et al. | Oct. 13, 1953 |
| 2,661,763 | Renick | Dec. 8, 1953 |
| 2,696,975 | Massey et al. | Dec. 14, 1954 |
| 2,772,621 | Arnoldi | Dec. 4, 1956 |